United States Patent
Hauber et al.

(10) Patent No.: US 10,767,368 B2
(45) Date of Patent: *Sep. 8, 2020

(54) PLASTIC COATED COMPOSITE BUILDING BOARDS AND METHOD OF MAKING SAME

(71) Applicant: CertainTeed Gypsum, Inc., Malvern, PA (US)

(72) Inventors: Robert J. Hauber, Lutz, FL (US); Gerald D. Boydston, Cody, WY (US)

(73) Assignee: CertainTeed Gypsum, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,922

(22) Filed: Dec. 29, 2017

(65) Prior Publication Data

US 2018/0187416 A1 Jul. 5, 2018

Related U.S. Application Data

(60) Continuation of application No. 15/044,639, filed on Feb. 16, 2016, now Pat. No. 9,885,179, which is a
(Continued)

(51) Int. Cl.
*E04C 2/06* (2006.01)
*B28B 19/00* (2006.01)
(Continued)

(52) U.S. Cl.
CPC ............ *E04C 2/06* (2013.01); *B28B 19/0092* (2013.01); *B28B 23/0006* (2013.01); *B29D 99/0021* (2013.01); *B32B 3/04* (2013.01); *B32B 5/022* (2013.01); *B32B 5/22* (2013.01); *B32B 5/26* (2013.01); *B32B 7/02* (2013.01); *B32B 7/08* (2013.01); *B32B 7/10* (2013.01); *B32B 13/04* (2013.01); *B32B 13/08* (2013.01); *B32B 13/12* (2013.01); *B32B 13/14* (2013.01); *B32B 27/08* (2013.01); *B32B 27/10* (2013.01); *B32B 27/12* (2013.01); *B32B 27/28* (2013.01); *B32B 27/30* (2013.01); *B32B 27/306* (2013.01); *B32B 27/308* (2013.01); *B32B 27/32* (2013.01);
(Continued)

(58) Field of Classification Search
CPC ........................................................ E04C 2/06
USPC ........................... 428/218; 442/394; 427/299
See application file for complete search history.

(56) References Cited

U.S. PATENT DOCUMENTS

| | | | | |
|---|---|---|---|---|
| 2002/0102390 A1 * | 8/2002 | O'Neill | ............... | B29C 44/1209 428/192 |
| 2003/0118377 A1 * | 6/2003 | Hirano | ............... | G03G 15/0812 399/284 |

(Continued)

FOREIGN PATENT DOCUMENTS

CA 2070489 A1 * 12/1993 ........... C04B 41/009

*Primary Examiner* — Tahseen Khan
(74) *Attorney, Agent, or Firm* — McDonnell Boehnen Hulbert & Berghoff LLP

(57) ABSTRACT

Disclosed are composite building boards and associated manufacturing methods. The composite boards may include, for example, one or more slurry layers with embedded fibrous mats. An exterior plastic coating is mechanically adhered to the underlying slurry layer. The plastic layer chemically bonds and cross-links with polymer additives within the slurry layer. The result is an integrated polymer matrix with greatly improved durability and surface strength.

20 Claims, 4 Drawing Sheets

Related U.S. Application Data continuation of application No. 13/941,950, filed on Jul. 15, 2013, now Pat. No. 9,259,888, which is a division of application No. 12/480,159, filed on Jun. 8, 2009, now Pat. No. 8,486,516.

(60) Provisional application No. 61/093,167, filed on Aug. 29, 2008.

(51) Int. Cl.

| | | |
|---|---|---|
| *B28B 23/00* | (2006.01) | |
| *B32B 13/14* | (2006.01) | |
| *C04B 28/14* | (2006.01) | |
| *E04C 2/04* | (2006.01) | |
| *B32B 5/02* | (2006.01) | |
| *B32B 5/22* | (2006.01) | |
| *B32B 5/26* | (2006.01) | |
| *B32B 7/02* | (2019.01) | |
| *B32B 7/08* | (2019.01) | |
| *B32B 7/10* | (2006.01) | |
| *B32B 13/04* | (2006.01) | |
| *B32B 13/08* | (2006.01) | |
| *B32B 13/12* | (2006.01) | |
| *B32B 27/08* | (2006.01) | |
| *B32B 27/10* | (2006.01) | |
| *B32B 27/12* | (2006.01) | |
| *B32B 27/28* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 3/04* | (2006.01) | |
| *B29D 99/00* | (2010.01) | |
| *C04B 24/26* | (2006.01) | |
| *C04B 111/00* | (2006.01) | |

(52) U.S. Cl.
CPC .............. *B32B 27/34* (2013.01); *B32B 27/36* (2013.01); *C04B 24/2623* (2013.01); *C04B 28/14* (2013.01); *E04C 2/043* (2013.01); *B32B 2250/44* (2013.01); *B32B 2255/02* (2013.01); *B32B 2255/26* (2013.01); *B32B 2260/021* (2013.01); *B32B 2260/044* (2013.01); *B32B 2260/046* (2013.01); *B32B 2262/101* (2013.01); *B32B 2264/10* (2013.01); *B32B 2307/102* (2013.01); *B32B 2307/202* (2013.01); *B32B 2307/304* (2013.01); *B32B 2307/3065* (2013.01); *B32B 2307/402* (2013.01); *B32B 2307/414* (2013.01); *B32B 2307/50* (2013.01); *B32B 2307/514* (2013.01); *B32B 2307/536* (2013.01); *B32B 2307/54* (2013.01); *B32B 2307/554* (2013.01); *B32B 2307/558* (2013.01); *B32B 2307/58* (2013.01); *B32B 2307/5825* (2013.01); *B32B 2307/71* (2013.01); *B32B 2307/7265* (2013.01); *B32B 2419/00* (2013.01); *B32B 2607/00* (2013.01); *C04B 2111/00405* (2013.01); *C04B 2111/00612* (2013.01); *Y10T 428/24992* (2015.01); *Y10T 428/249955* (2015.04); *Y10T 428/31504* (2015.04); *Y10T 428/31678* (2015.04); *Y10T 428/31993* (2015.04); *Y10T 442/20* (2015.04); *Y10T 442/2926* (2015.04); *Y10T 442/604* (2015.04)

(56) References Cited

U.S. PATENT DOCUMENTS

| | | | |
|---|---|---|---|
| 2005/0202228 A1* | 9/2005 | Kajander | D04H 5/12 428/294.7 |
| 2005/0202742 A1* | 9/2005 | Smith | B28B 19/0092 442/256 |
| 2007/0015424 A1* | 1/2007 | Toas | B32B 27/06 442/59 |
| 2007/0282046 A1* | 12/2007 | Killilea | C09D 133/02 524/261 |

\* cited by examiner

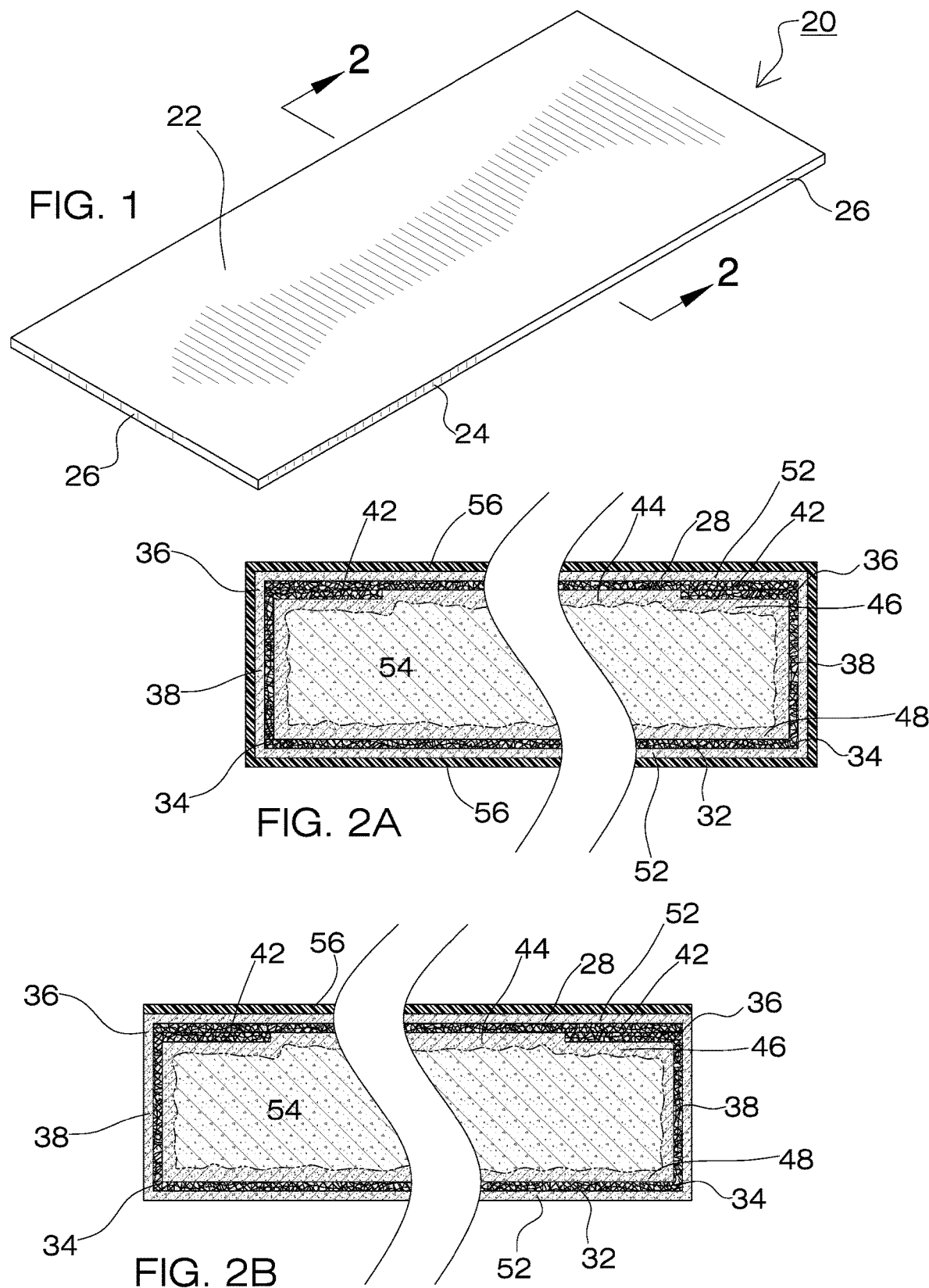

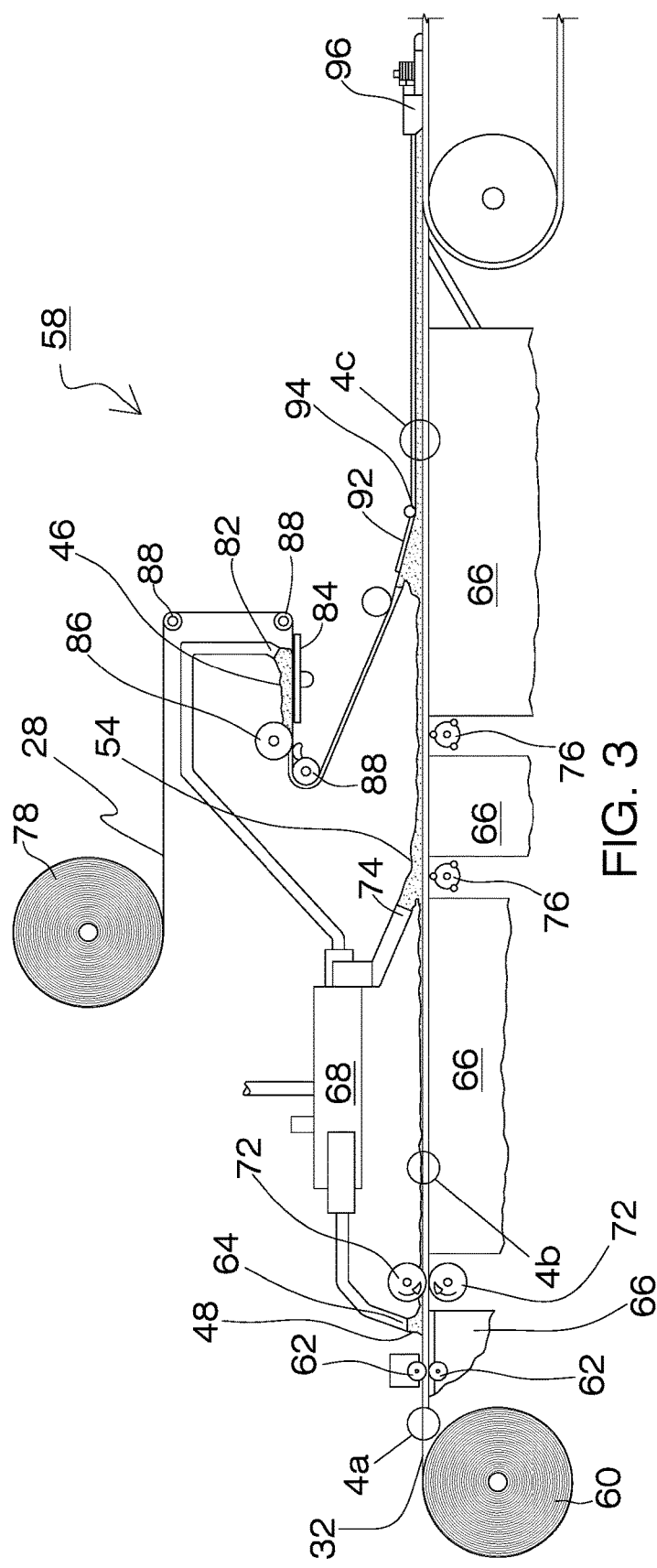
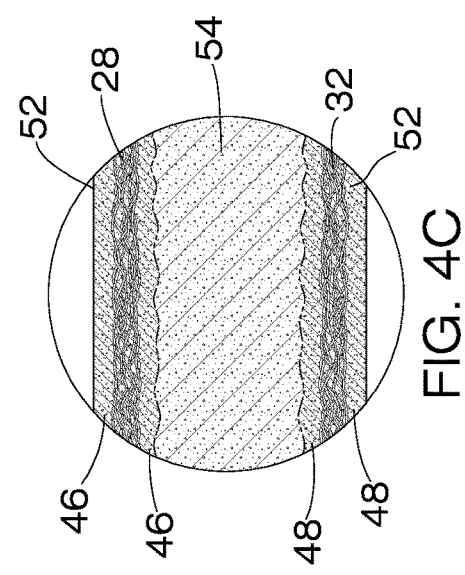
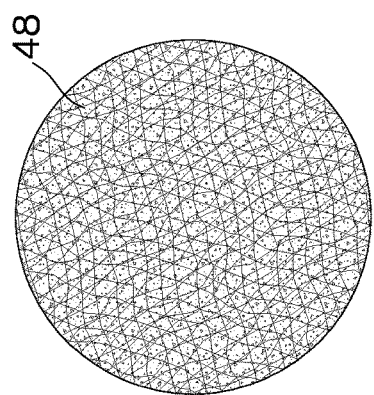
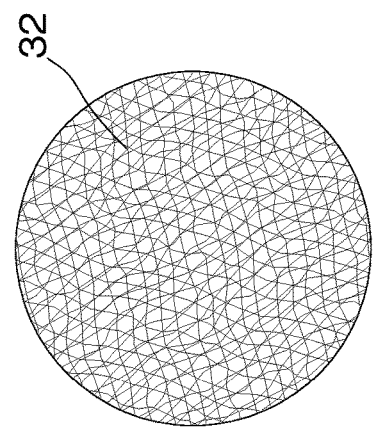
FIG. 3
FIG. 4A
FIG. 4B
FIG. 4C

PLASTIC COATED COMPOSITE BUILDING BOARDS AND METHOD OF MAKING SAME

RELATED APPLICATION DATA

This application claims priority to and is a continuation of application Ser. No. 15/044,639 filed Feb. 16, 2016 and entitled "Plastic Coated Composite Building Boards and Method of Making Same," which is a continuation of application Ser. No. 13/941,950 filed Jul. 15, 2013 and entitled "Plastic Coated Composite Building Boards and Method of Making Same," now U.S. Pat. No. 9,259,888, which is a divisional of application Ser. No. 12/480,159 filed on Jun. 8, 2009 and entitled "Plastic Coated Composite Building Boards and Method of Making Same," now U.S. Pat. No. 8,486,516, which, in turn, claims priority to provisional application Ser. No. 61/093,167 filed on Aug. 29, 2008 entitled "Thermoplastic Coatings for Glass Reinforced Faced Gypsum Board." The contents of these applications are fully incorporated herein by reference.

BACKGROUND OF THE INVENTION

Field of the Invention

This invention relates to an improved construction for composite building boards. More particularly, the present invention relates to composite building boards that include an exterior plastic coating and a pre-coated fibrous mat for increasing the durability and surface strength of the resulting board.

Description of the Background Art

Building board, also known as wallboard, plasterboard, or drywall, is one of the most commonly used building components in the world today. Building board is frequently used within the interior of a dwelling, where it functions both as a finished wall covering and as a structural room partition. Building board can also be used on the exterior of a dwelling, where it serves as a sheathing to provide weather protection and insulation. Building board can also be used as an interior facing for other structures as well, such as stairwells, elevator shafts, and interior ducting.

One particularly popular form of building board is known as gypsum board. Gypsum board is constructed by depositing a layer of cementitious gypsum slurry between two opposing paper liners. Gypsum slurry is the semi-hydrous form of calcium sulfate and has many physical characteristics that make it suitable for use as a building component. For example, gypsum boards generally have a smooth external surface, a consistent thickness, and allow for the application of finishing enhancements, such as paint. Gypsum board is also desirable because it provides a degree of fire resistance and sound abatement.

An example of a paper-covered gypsum board is disclosed in U.S. Pat. No. 2,806,811 to Von Hazmburg. Von Hazmburg discloses a board that primarily consists of a thick gypsum core that is encased in a fibrous envelope consisting of both a manila sheet and a newsprint sheet. These sheet layers can be made from a conventional multi-cylinder paper making process.

Although conventional paper faced gypsum board, such as that disclosed by Von Hazmburg, is acceptable for many applications, it also has considerable drawbacks. The biggest drawback is durability. Gypsum board is far more brittle than other building materials, such as wood or masonry based materials. Paper faced gypsum boards, therefore, chip and/or crumble under both compressive and tensile loads. As a result, conventional gypsum board is easily damaged by the normal wear and tear within a dwelling, such as impacts with people and/or furniture. Conventional gypsum board construction often has poor load carrying capacity and inadequate nail pull strength. As a result, traditional gypsum board often cannot support the loads needed to hang pictures or install shelving.

As a consequence of these drawbacks, efforts have been made over the years to improve the durability and surface strength of gypsum board. One particularly useful development is known as glass reinforced gypsum (GRG) board. An example of one such board is disclosed in U.S. Pat. No. 4,265,979 to Baehr et. al. Baehr discloses a paper-free gypsum board construction. More specifically, Baehr replaces paper facing sheets with opposing layers formed, in part, from glass fiber mats. This construction provides a stronger and harder external surface and is an improvement over paper faced boards. Although an improvement from the standpoint of durability, the use of exposed fiber mats is problematic. Namely, workers handling such boards are exposed to lose strands of fiber. This poses a health risk and necessitates the use of protective gloves and/or masks. Thus, GRG boards utilizing exposed facing sheets are not ideal.

A subsequent improvement is described in commonly owned U.S. Pat. No. 4,378,452 to Pilgrim. The contents of the Pilgrim patent are fully incorporated herein by reference. Pilgrim discloses a GRG board that is faced on one or both sides with a porous, nonwoven glass mat. However, the glass mat of Pilgrim is slightly embedded into the slurry core. This is accomplished by vibrating the gypsum slurry to cause it to pass through the porous openings in the mat.

Embedding the mat within the core results in a thin film of slurry being formed on the outer surface of the board. Building boards with this construction are referred to as embedded glass reinforced gypsum (EGRG) boards. EGRG boards eliminate, or greatly reduce, the presence of exposed fibers and otherwise provide a smooth working surface. Despite eliminating the safety issues surrounding GRG boards, Pilgrim ultimately failed to provide a board with sufficient strength and durability.

A further improved EGRG board is disclosed in commonly owned U.S. Pat. No. 6,524,679 to Hauber, et al. The contents of the Hauber patent are fully incorporated herein by reference. The EGRG board of Hauber adds a polymeric compound to the gypsum slurry. Suitable polymeric compounds may include, for example, polyvinyidene chloride (PVDC), or polyvinylchloride (PVC), or similar polymers. The polymer additive increases durability and board strength and also creates a matrix within the slurry after it sets. Although certainly an improvement over existing EGRG technology, Hauber did not address issues associated with the durability of the exterior face or the complete mechanical and chemical bonding of the exterior face to the underlying gypsum slurry.

Thus, there still exists a need in the art for improved building board construction. More specifically, there is a need in the art for a board with a polymer matrix that provides enhanced durability, impact resistance, water repellency, fire resistance, and load carrying capacities. There is also a need in the art for a board that provides these physical properties without unduly increasing the weight or cost of the resulting board. The present invention is aimed at achieving these objectives.

SUMMARY OF THE INVENTION

It is therefore one of the objects of the present invention to enhance the physical characteristics of conventional building board.

It is another object of this invention to increase the durability and load carrying capacity of building board with minimal increases in weight and cost.

It is another object of the present invention to coat building boards with a polymer that yields specific physical properties depending upon the intended use of the board.

Another object of the present invention is to provide a building board with beneficial physical characteristics via the inclusion of a fibrous mat with a thermoplastic pre-coating.

Yet another object of this invention is to provide a building board with an exterior coating that is engineered to enhance one or more physical properties, such as UV resistance, electrical conductivity, EMF resistance, sound attenuation, and water and fire resistance.

It is also an object of the present invention to cross-link an external polymer coating to polymer additives present within the core of a gypsum board.

It is still yet another object of the present invention to provide a building board construction that includes a thermoplastic coating that is applied to an underlying polymer modified dense slurry layer to thereby create a low cost, lightweight, durable board.

Yet another object of this invention is to offer process improvements that significantly reduce manufacturing costs and which allow for the economical production of building board.

It is also an object of the present invention to utilize a pre-coated fibrous mat in conjunction with an external thermoplastic coating.

Still yet another object of the invention is utilize a thermoplastic pre-coating on a glass mat that is embedded within a dense slurry layer to thereby produce a truly composite building board.

Another object of the present invention is to bind together a mat of organic and/or inorganic fibers with a holt melt thermoplastic polymer, as opposed to traditional thermal setting binders.

Yet another object of the present invention is to bind together a mat of continuous and/or non-continuous fibers with a hot melt thermoplastic polymer, as opposed to traditional thermal setting binders.

It is a further object of the present invention to provide a building board with significant cost advantages and performance characteristics.

Another object of the present invention is to apply a continuous and uniform layer of thermoplastic upon the fibers of a mat, whereby the thermoplastic cools instantly to thereby eliminate the energy costs associated with drying steps needed in traditional board manufacturing processes.

Still yet another object of the present invention is to eliminate fiber loss and/or disengagement via the application of a thermoplastic layer to there by eliminate costs associated with the dust and/or debris removal steps necessary in traditional board manufacture.

Finally, it is an object of the present invention to use thermoplastics to create instantly strong and bound fibrous mats, whereby manufacturing speeds can be greatly increased.

These and other objects are carried out by providing a composite building board that includes a porous mat with a thermoplastic pre-coating. The board further includes a cementitious slurry layer that penetrates the porous mat to thereby form a boundary layer that substantially covers the mat's exterior surface. The board also includes an external polymer coating that is mechanically and chemically adhered to the boundary layer and which forms forming a polymer matrix within the composite building board.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention.

It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a perspective view of a building board constructed in accordance with the present invention.

FIG. 2a is a cross sectional view of the building board taken along line 2-2 of FIG. 1.

FIG. 2b is a cross sectional view of an alternative building board construction taken along line 2-2 of FIG. 1.

FIG. 3 is a view of a manufacturing process that can be employed in constructing building boards of the present invention.

FIGS. 4a-4c are detailed views taken from FIG. 3.

Similar reference characters refer to similar parts throughout the several views of the drawings.

DETAILED DESCRIPTION OF THE PREFERRED EMBODIMENT

Figure 5:
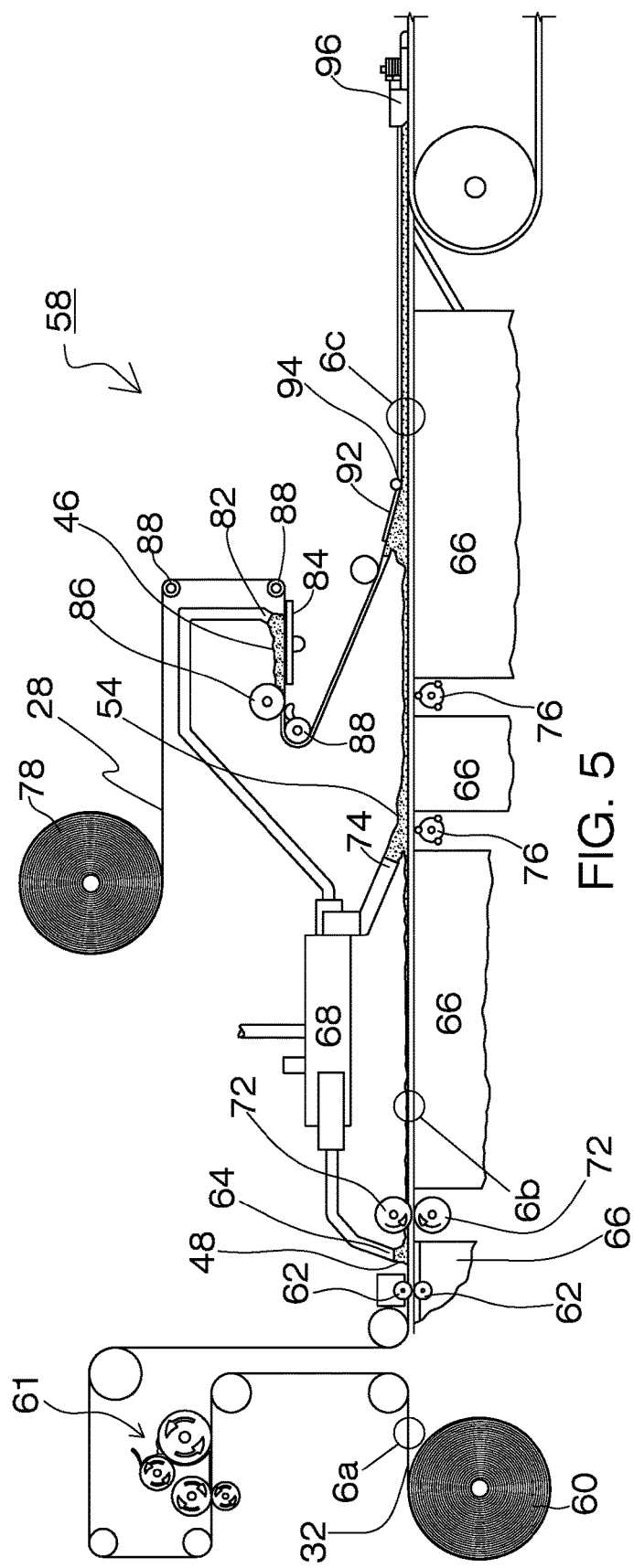
FIG. 5 is a view of an alternative manufacturing process that can be employed in constructing the building boards of the present invention.

The present invention relates to composite building boards and associated manufacturing methods. In particular, the invention relates to composite boards that may include, for example, one or more slurry layers with embedded fibrous mats. In accordance with the invention, an exterior plastic coating is mechanically adhered to an underlying slurry layer. The plastic coating chemically bonds and cross-links with polymer additives within the slurry layer. Additional benefits are realized by precoating one or more of the fibrous mats prior to embedment within the slurry layer.

The result is a fully integrated polymer matrix with greatly improved durability and surface strength with only minimal increases in cost or weight.

Composite Board Construction

With reference now to FIG. 1, the composite building board 20 of the present invention is depicted. Building board is typically formed in long sheets in a continuous production line process. The sheets are thereafter cut to a desired length. Boards are produced in standardized widths of either 4 or 9 feet, depending upon the intended use. However, the present invention is by no means limited to any specific board dimensions or geometry. As noted in more detail hereinafter, board 20 includes an upper surface 22 that includes a plastic coating. Plastic coatings can likewise be applied to the bottom 24 and side edges 26 of board 20.

FIG. 2a illustrates the composite cross section of board 20. Namely, board 20 includes upper and lower fibrous mats (28 and 32) that are embedded within a multi-layered gypsum slurry. The depicted embodiment illustrates two fiber mats (28,32), although those skilled in the art will appreciate that any number of mats can be utilized. In the preferred embodiment, these mats (28, 32) are formed from a grouping of nonwoven and randomly aligned fibers that are held together in a binder. Suitable binders include resins, such as urea-formaldehyde. The fibers of the mat are preferably long inorganic fibers, such as glass fibers. The fibers can also be continuous or non-continuous or blends of both. The fibers can be formed from organic or inorganic filaments. In one embodiment, mineral fibers are used. Small diameter fibers are preferred; namely, fibers with an average diameter of between approximately 13-16 µm. The resulting mat is sufficiently porous to allow for the passage of gypsum slurry between the individual fibers, whereby the interior and exterior faces of the mat can be coated, or substantially coated, with gypsum slurry. Although porous, mats (28, 32) nonetheless serve to strengthen the face of the resulting board 20. Suitable fiber mats are more fully described in commonly owned U.S. Pat. No. 6,524,679 to Hauber, the contents of which are fully incorporated herein. Furthermore, as described below, mats (28, 32) can be pre-coated in order to increase composite bonding and board strength.

Lower mat 32 optionally includes a pair of folds (34, 36) within each side. First folds 34 create the upstanding side edges 38 of lower mat 32. Side edges 38 are generally formed at a 90° angle to the remainder of mat 32 and, thereby, serve to reinforce the side edges 26 of board 20. Second folds 36 form the inwardly directed upper edges 42 of lower mat 32. Upper edges 42 are sometimes referred to as machine edges. Upper edges 42 are preferably spaced from one another to form a gap 44. The result is a partially closed channel. Upper edges 42 provide a surface for supporting upper mat 28. As described in greater detail hereinafter, folds (34, 36) within lower mat 32 are formed by creaser wheels during the manufacturing process.

In addition to strengthening board 20, side edges 38 of lower mat 32 also form a channel for receiving a volume of slurry. Once a sufficient amount of slurry has been deposited into the channel, the upper mat 28 is secured over top of the inwardly directed upper edges 42. The result is a closed fiber mat that reinforces all four sides (22, 24, 26) of building board 20.

Composite board 20, in the preferred embodiment, is formed from three discrete cementitious gypsum slurry layers. More specifically, board 20 includes upper and lower slurry layers (46 and 48) as well as an intermediate core layer 54. As described in U.S. Pat. No. 6,524,679 to Hauber, the upper and lower layers (46 and 48) are formed from a denser slurry than the intermediate core layer 54. This construction has the added benefit of strengthening the exterior faces of board 20 without unnecessarily increasing the overall weight.

During the manufacturing process, the upper and lower dense slurry layers (46, 48) are coated and adhere to upper and lower mats (28, 32), respectively. Rollers are then used to push the dense slurry (46, 48) through the pores within mats (28, 32). Because mats (28, 32) are porous, the dense gypsum slurry is allowed to fully penetrate the mats (28, 32). As a result, and as depicted in FIG. 2a, a layer of dense gypsum slurry (46, 48) substantially covers both the internal and external faces of upper and lower mats 28,32). Dense gypsum slurry (46, 48) generally forms a thicker layer on the interior surfaces. As noted in FIGS. 2a-b, the internal dense slurry layer (46, 48) interfaces with slurry core 54. The dense slurry layer (46, 48) also forms a thin boundary layer 52 of between 0.01 to 2.0 millimeters (mm) as measured from the exterior surface of fiber mat (28, 32).

Boundary layer 52 thereby forms a topographically that undulates into and out of the underlying glass mats (28, 32) but which nonetheless covers the individuals fibers of mats (28, 32). Alternatively, boundary layer 52 can form a uniform and smooth covering surface over mats (28, 32). In either event, complete embedment of mats (28, 32) is achieved as a result of the slurry penetration. In the preferred embodiment, the slurry penetrates between 95% to 100% of mats (28, 32) and forms a smooth and relatively level and uniform polymer modified composite dense gypsum outer surface layer.

Boundary layer 52 also interfaces with the external plastic coating as illustrated in FIG. 2a. Alternatively, in the event plastic coating 56 is not utilized on all surfaces, as noted in FIG. 2a, boundary layer 52 cures to form the exterior surface of board 20. In this case, boundary layer 52 prevents fibers from mats (28,32) from being exposed.

The outer dense slurry layers (46, 48, and 52) all preferably include a polymer additive to increase the overall durability and surface strength of the board. The polymer additive also preferably facilitates a strong chemical bond between itself and the exterior plastic coating 56. Suitable polymer additives will provide a root structure to which coating 56 can attach. Suitable polymeric compounds may include, for example, polyvinyidene chloride (PVDC), or polyvinylchloride (PVC), or similar polymers. Another suitable polymer additive is a functionalized styrene butadiene (SBD) latex that is available from Omnova Solutions of Fairlawn, Ohio. Yet another suitable additive is silane or a functionalized silane (SiH4) Silane compounds are ideally used in conjunction with other polymers to facilitate coupling between the polymer to glass fibers. Silane is also known as a stabilizing agent. Suitable silane compounds are sold by Down Corning. Still yet other polymer additives are described in U.S. Pat. No. 6,524,679 to Hauber. Whatever additive is utilized, it should be capable of providing covalent, allyl, Vanderwal, single and double bonding to the exterior plastic coating 56.

Core slurry layer 54 generally comprises the majority of board 20 and extends fully between, and bonds with, the upper and lower dense slurry layers (46, 48). In one possible manufacturing method, core slurry layer 54 is deposited over top of lower slurry layer 48 (along with embedded lower fiber mat 32). Thereafter, upper dense slurry layer 46 (along with embedded upper fiber mat 28) is applied over core slurry 54. As with the upper and lower slurry layers (46, 48), core slurry 54 can likewise include a polymer additive for the purpose of adding durability and surface strength.

The polymer additive within core slurry 54 preferably chemically bonds with, and cross-links to, the polymer additives within the other slurry layers (46, 48, and 52).

External Plastic Coating

After the various slurry layers have been assembled an outer plastic coating 56 is applied to the dense slurry boundary layer 52. Coating 56 can be optionally applied to any or all board surfaces. In the embodiment depicted in FIG. 2*a*, plastic coating 56 is applied to the top and bottom surfaces (22, 24) as well as the peripheral edges 26. In the embodiment depicted in FIG. 2*b*, plastic coating 56 is only applied to the top most surface 22. The number of coated surfaces will depend upon the intended use of the board. The intended use will also dictate the composition of coating 56. Plastic coating 56 is ideally chosen to give the exterior surfaces (22, 24, and 26) enhanced surface strength and load carrying capacity. Other desirable characteristics provided by coating 56 include flexibility, sound attenuation, water, mold and mildew resistance, as well as a variety of architectural effects.

To achieve this, coating 56 can be any of a variety of synthetic, semi-synthetic, or organic polymers. Both reactive and nonreactive polymers can be used. Isotactic and atactic polymers can likewise be used.

Additionally, multilayer laminated polymer coatings can be used to provide even greater strength and durability. When a polymer coating according to the present invention has been applied to the board, the top-most coating then can serve as an additional foundation on which other coatings and/or laminates can be applied. The properties of the different layers may be made compatible so as to form a strong chemical bond between the successively applied layers. This results in laminates with strong bonding capabilities. The laminated layers can also be incorporated into, or made to form, complete composite structures. It is further noted that the external thermoplastic layer 56 can be used on a board that does not include fibrous mats (28, 32). For example, a paper facing layer can be used in lieu of mats (28 and 32).

The following is a list of various polymers that can be used, either individually or in combination with one another, for polymer coating 56: Acrylonitrile butadiene styrene (ABS), Celluloid, Cellulose Acetate, Ethylene-Butyl, Acrylate, Ethylene-Methyl Acrylate, Ethylene Vinyl Acetate (EVA), Ethylene-Acrylic-Acid-copolymer (EAA); Ethylene Vinyl Alcohol (EVAL), Fluoroplastics (PTFEs, including FEP, PFA, CTFE, ECTFE, ETFE), ionomers, Liquid Crystal Polymer (LCP), Polyacetal (POM or Acetal), Polyacrylates (Melt and Cure Acrylics), Polyacrylonitrile (PAN or Acrylonitrile), Polyamide (PA or Nylon), Polyamide-imide (PAI), Polyaryletherketone (PAEK or Ketone), Polybutyadiene (PBD), Polybutylene (PB), Polybutylene Terephthalate (PBT), Polybutylene Terephthalate (PET), Polycyclohexylene Dimethylene Terephthalate (PCT), Polycarbonate (PC), Polyketone (PK), Polyester, Polyethylene/Polythene/Polyethane, Polyether Block Amide (PEBA), Polyeretherketone (PEEK), Polyetherimide (PEI), Polyethersulfone (PES), Polyethylenechlorinates (PEC), Polyimide (PI), Polyactic Acid (PLA), Polymethylpentene (PMP), Polyphenylene Oxide (PPO), Polyphenylene Sulfide (PPS), Polyphthalamide (PPA), Polypropylene (PP), Polystyrene (PS), Polysulfone (PSU), Polyvinyl Chloride (PVC), Spectralon, and thermoplastic Olefinic Elastomers (TPO).

Of these, it is preferred to use a hot melt thermoplastic with a melting point of between 100° F. to 500° F. Either natural or synthetic hot melt thermoplastics can be used. Additionally, the present inventors have determined that hot melt thermoplastics having a melting point within the specified range allows a plastic coating to be applied in a liquefied form without calcining the underlying gypsum. Preferred hot melt thermoplastics include both EVA and EAA polymers, as both have suitable melting points and otherwise provide sufficient bonding points for the polymer additives in the dense gypsum layers of the board.

In addition to the foregoing, polyolefin polymers can also be used, including polar or nonpolar polyolefenic compounds, crystalline or amorphous polyolefenic compounds, natural or synthetic tacifying resins as part of polyolefenic compounds, and low viscosity polyolefenic compounds. The selected polymer can also be used to generate a variety of films, including microscopically continuous and/or non-continuous films engineered for molecular water permeability, non-oriented polymer films, planar oriented polymer films, randomly oriented polymer films, and films with low thermal conductivity.

Whatever polymer coating 56 is utilized, it should provide excellent mechanical adhesion to the underlying dense slurry layers and also chemically bond to polymer additives included therein. Mechanical adhesion can be achieved via topographic mirroring of the polymeric coating 56 to the underlying dense slurry boundary layer 52. This topographic mirroring can be accomplished by controlling the hardness and pressure of the application rollers. Topographic mirroring can also be accomplished by varying application heat, thereby employing vacuum like forces upon cooling which draws the coating into the topography, which is an unexpected result discovered by the inventors during development.

Chemical bonding between coating 56 and the underlying slurry layers 46, 48, 52, and 54 is achieved by cross-linking polymer coating 56 with the polymer additives contained within the various slurry layers: namely, upper slurry layer 46, lower slurry layer 48, slurry boundary layer 52, and core slurry layer 54. The respective polymers are chosen to ensure adequate cross-linking and the creation of long, high molecular weight polymer chains that extend throughout composite board 20. For instance, correct selection of the polymeric coating 56 allows for the creation of ionic, valent and covalent bonding, as well as bonding via van der Waals forces. Moreover, if a nonreactive polymeric coating is selected, coating 56 will initiate with the underlying polymer additives after the coating 56 is taken through a phase change. Alternatively, if a reactive polymeric coating is selected, coating 56 will polymerize upon application to the underlying boundary layer 52.

Performance enhancing fillers and/or modifiers can also be added to polymer coating 56. These fillers and modifiers can provide any of the following physical enhancements: UV resistance, electrical conductivity, electromagnetic force (EMF) resistance, lower polymeric densities, sound attenuation, water resistance, and flame retarding, heat transfer resistance, elastomeric performance enhancers, strength modification, weather stabilization, improved esthetics, and phosphorescence, photochromatic or polychromatic enhancements.

The flame retardant properties may be chemical, intumescent, expanding, natural or synthetic. Density modifiers and sound attenuators may include gasses, for example nitrogen, solids, liquids or nano-particles, and micro-fine particulate rubbers. Strength modification may be provided by fillers or modifiers that are metals, organic or inorganic compounds, including fibrous or synthetic fiber compounds, flakes or nano materials. Weather stabilization may include synthetic and natural light stabilizers for providing protection against infrared, visible and ultraviolet light. Other stabilizers may also be added for improved performance, such as free radical scavengers, oxygen scavengers, and the like.

As illustrated in the cross-sectional views of FIG. 2, plastic coating 56 is directly applied to the slurry boundary layer 52 that is formed on the external surface of mats 28 and 32. Polymer coating 56 can be laid down by any of a wide variety of hot melt coating applications. Suitable coating applications are more fully described hereinafter in conjunction with FIGS. 7-10. In the preferred embodiment, polymer coating 56 is applied in a thickness of between 0.01 to 500 mils.

Although 0.01 to 500 mils is disclosed as preferred, different applications may require different thicknesses. For example, for glass reinforced gypsum boards used for sheathing, a coating of between 0.25 to 3 mil is preferred. Similarly, for more robust applications, for example, underlayment or shaft lining, the coating is increased to a range of from 1.8 g to 3.5 g by weight. For tile backing applications, which require more integrity and water resistance, a thicknesses of about 1-10 mils is required. For varying the level of smoothness in interior gypsum boards, a level 2 finish board may require a 0.25-0.9 mil coating; a level 3 finish may require a 1.0-1.9 mil coating; a level 4 finish may require a 2.0-2.9 mil coating; and a level 5 finish may require a 2.5-5.0 mil coating. Another very rugged, structural, or highly thermally insulating, product may have thicker coatings. The weight and the resulting thickness of the coating may be varied at will based upon the performance criteria required in the finished product and the inherent chemical and physical properties of the particular coating applied to a particular product.

A coating of between 0.01 to 500 mils will result in a building board with an exterior surface hardness of between 50 to 150 on the Rockwell hardness scale, or a minimum of about 15 to a maximum of about 70 on a Shore A and D hardness scale. The preferred water vapor permeability of the final coating 56 is anywhere between a minimum of about 0.01 (nearly water impervious) to a maximum of about 98 (nearly complete water transmission). Also, depending upon the intended use of the board, coating 56 may be applied with a topography that ranges from smooth to coarse, or even fluted to chamfered. Additives can also be included within polymer coating 56 to provide for a film translucence ranging from 0.001% to 100%.

Another possible improvement is providing sound attenuation by having offset patterns and or shapes or lines in the face and or back surfaces of boards 20. Thus, when two or more boards 20 are placed in facing relation, the offset portions come into contact with each other, thereby creating air pockets between the two boards 20. Air pockets provide excellent insulation and sound dampening as well as heat insulation for fire retardation purposes.

Additionally, injection of micro air bubbles or heat activated expanded polymeric cells or expanded polymeric cells into the molten thermoplastic prior to the thermoplastic coating 56 being applied to the polymer modified gypsum surface has resulted in another unexpected discovery of the invention herein disclosed. That is the entrained air bubbles or shallow cells can provide built in sound attenuation at the application surface of the composite board 20. Introduction of any filler material into the molten thermoplastic results in the filler becoming permanently suspended within the thermoplastic, in either a molten or cooled state. Injecting micro air bubbles into the thermoplastic during the coating process to reduce density also results in significant sound attenuation of the exposed surface on which the coating 56 has been applied. Air as used herein should be understood to include any type of gaseous materials, for example, nitrogen or an inert gas.

Pre-Coating of Fibrous Mats

In a further embodiment of the present invention, fibrous mats (28 and 32) are pre-coated with a hot melt thermoplastic prior to embedment within dense slurry layers 46 and 48. The thermoplastic coating 56 is thereafter applied over the outer surface of board 20 as described above. Pre-coating mats 28 and 32 yields a strong, light weight composite board with a chemical matrix that interconnects fibrous mats (28 and 32), dense slurry layers (46, 48), exterior gypsum coating 56, and gypsum core 54.

As noted above, a wide range of materials can be used for the filaments (both organic and inorganic) comprising fibrous mats 28 and 32; however, randomly aligned glass fibers are preferred. Similarly, mats 28 and 32 can be formed from continuous and/or non-continuous filaments. The individual fibers are held together with a binder, such as urea-formaldehyde.

Although both the upper and lower fibrous mats (28 and 32) can be pre-coated, the pre-coating is preferably limited to lower mat 32. This is because lower mat 32 underlies the facing side board 20 and therefore has greater strength requirements. Any of a variety of plastics can be used to pre-coat the fibers of mat 32. Suitable plastics include any of the polymers described above in connection with external plastic coating 56. For sake of brevity, this list has not been duplicated, but is instead incorporated by reference. In the preferred embodiment, the plastic pre-coating is a hot melt thermoplastic with a melting point of between 100° F. and 500° F.; and more specifically, either an ethylene vinyl acetate (EVA) or ethylene methyl acrylonitrile (EAA).

The thermoplastic pre-coating can be applied in a smooth layer or in a layer the follows the topography of the underlying mat. In the preferred embodiment, the thermoplastic is applied in a coating that is between 0.1 to 10 mils thick. The thermoplastic pre-coating can also be filled, or not filled, colored or translucent.

Prior to the pre-coating being applied, mat 32 is treated with a combination of acid, isopropyl alcohol, and a silane coupling agent. This pre-treatment step effectively prepares the individual fibers of mat 32 for the subsequent thermoplastic coating. The acid of the pre-treatment step activates binders present within the mat 32 to thereby facilitate bonding. The acid also permits the fibers of mat 32 to bind with the silane coupling agent. The silane coupling agent, in turn, ensures a tight bond between the individual fibers of mat 32 and the surrounding thermoplastic. Silane is a known coupling agent that facilitates bonding between polymers and glass fibers. Silane is also known as a stabilizing agent. Suitable silane compounds are sold by Dow Corning.

Following the pre-treatment step, the thermoplastic pre-coating is applied in a liquefied state. Any of the hot melt coating techniques depicted in FIGS. 7-10 can be utilized in this step. As noted in FIG. 6a, the pre-coating adheres to the individual fibers of mat 32 so as to maintain the porosity of mat 32. Thus, even with precoating applied, mat 32 can be embedded within dense slurry layer 48. Once applied, the silane promotes bonding between the individual glass fibers and the surrounding thermoplastic. In this manner, the hot melt thermoplastic pre-coating forms a strong chemical and mechanical bond with the individual fibers of mat 32.

The silane facilitates other bonding as well. Namely, the silane promotes bonding between the thermoplastic pre-coating and binders present within mat 32. Bonding is also promoted between the thermoplastic pre-coating and the polymers present within dense slurry layers (46, 48), gypsum core 54 and the external thermoplastic coating 56. Still yet further bonding is promoted between the thermoplastic pre-coating and the calcium and sulfur within the surrounding gypsum. The result is a truly composite building panel, with all components of board 20 being chemically and mechanically bound together. Moreover, the composite panel can be achieved with or without the thermoplastic surface coating described above.

The present invention contemplates the complete replacement of traditional thermal setting binders (used to bind an organic and/or inorganic fibrous mat) with a hot melt thermoplastic polymer. An entirely thermoplastic bound fiber mat, while expected to improve manufacturing costs, has unexpectedly offered further advantages. These newly discovered advantages range from significantly improved "X", "Y", and "Z" axis strengths of the mat, as well as substantial ductility and flexibility improvements above those seen in mats incorporating traditional thermal setting binders.

The present inventors have further discovered that organic and/or inorganic fibers that are preconditioned with silane prior to the application of the hot melt thermoplastic binder, result in increased mat strength. The silane preconditioning also increases the bond at the interface between the hot melt thermoplastic and the organic and/or inorganic fibers. This, in turn, provides a "stretch" like characteristic to the mat comparably similar to that of organic muscle fibers and the known molecular memory pattern propensity for elastomeric stretch and precise rebound.

In addition to the foregoing, various fillers and additives can be included with the thermoplastic pre-coating in order to impart desired physical characteristics. For example, the pre-coating can be compounded with a gas to volumize the plastic and thereby reduce the amount of plastic needed to completely coat mat 32. Still yet other fillers can be applied to create cost savings. As those skilled in the art will realize, other additives can be included within the pre-coating to yield other properties and for instant product variation. The fillers can also be pretreated with silane upon incorporation into, or compounding with, the hot melt thermoplastic. Such pretreated fillers will be mechanically bound by the surrounding thermoplastic and will also be subsequently chemically bonded and locked into place.

Finally, it should be noted that the pre-coating of mats (28, 32) can be carried out with or without application of external plastic coating 56. For instance, the pre-coated mats described herein (i.e. mats singularly coated with thermoplastic, or coated with a thermoplastic that includes silane and/or fillers) can be used in connection with conventional gypsum faced boards. Alternatively, the pre-coated mats can be used in conjunction with cellulose or paper faced boards. In short, the pre-coating can be beneficially incorporated into any conventional building board construction.

Manufacturing Methods

Suitable manufacturing methods for the building board of the present invention are depicted in FIGS. 3-6. FIG. 3 discloses a plant with a particular process 58 for compiling composite board. This process is more fully described in commonly owned U.S. Pat. No. 6,524,679 to Hauber, the contents of which are fully incorporated herein. A brief review of this preferred manufacturing process is provided herein for sake of clarity. Those of ordinary skill in the art will recognize other manufacturing methods that are suitable for producing plastic coated boards in accordance with the present invention.

Process 58 includes a first supply roll 60 of fiber mat that forms lower fibrous mat 32. As noted in the detailed view of FIG. 4a, mat 32 is a porous structure formed from a grouping of individual fibers. Although fibers are preferred, longer fiber rovings can also be employed. After being rolled out, upper and lower creaser wheels 62 are used to form the first and second folds (34, 36). These folds (34, 36), in turn, create both upturned sides 38 and the inward edges 42 of lower mat 32. The upturned sides 38 serve to create a channel for receiving gypsum slurry core 54.

The first gypsum layer 48 is thereafter deposited unto mat 32. The gypsum slurry is supplied from mixer 68 and slurry outlet 64. The slurry dispensed from this outlet 64 is preferably a denser gypsum slurry. The slurry is deposited directly upon the lower mat 32 over a forming table 66. Thereafter, roll coaters 72 are used to press the deposited slurry 48 through lower mat 32. The porosity of mat 32 allows the dense slurry layer 48 to completely penetrate and coat both the interior and exterior surfaces of mat 32. FIG. 4b depicts mat 32 embedded within the slurry 48 after passage through the roll coaters 72. Ideally, a thin layer of dense gypsum 48 adheres to both the interior and exterior surfaces of mat 32.

Core slurry layer 54 is thereafter deposited at a downstream location via a second slurry outlet 74. Core slurry layer 54 comes from the same mixer 68 as dense slurry layer 48. However, as noted above, core slurry layer 54 is preferably less dense than the upper and lower slurry layers (46, 48) and forms the majority of the resulting panel 20. One or more vibrators 76, which are positioned between adjacent forming tables 66, are used to force air voids from the deposited gypsum slurry.

An additional supply of fiber mat 28 is then supplied from a second supply roll 78. Fiber mat 28 forms the upper fibrous mat of composite board 20. A third slurry outlet 82 is included for delivering a dense upper slurry layer 46 to fiber mat 28. This is done upon a separate forming table 84. Mat 28 is guided to forming table 84 via a series of guide rollers 88. A roller coater 86 is used to press dense slurry layer 46 through the porous fiber mat 28 so as to coat the internal and external surfaces. The coated fiber mat 28 is thereafter routed to the upper surface of core gypsum 54 via guide rollers 88. Upper mat 28 is then secured to the core slurry layer 54 and lower slurry layer 48 at a forming station. The forming station includes a forming plate 92 with an associated hinge 94. Forming station ensures that the various layers are pressed together to create a smooth composite gypsum board 20 with a uniform thickness. FIG. 4c is a detailed view showing the assembled components of board 20. As more fully described in the Hauber patent, a downstream edging assembly 96 can be used to smooth the edges of board 20.

Figure 6C:
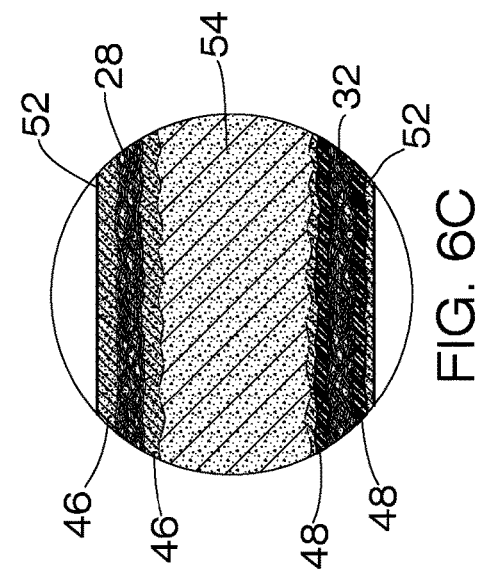
FIGS. 6a-6c are detailed view taken from FIG. 5.
Figure 6B:
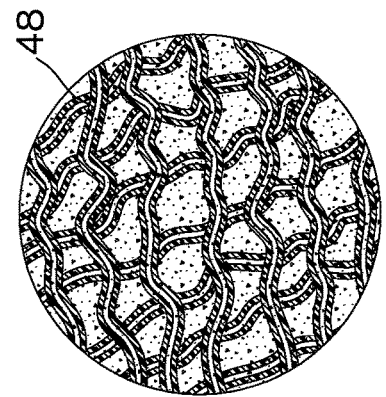
Figure 6A:
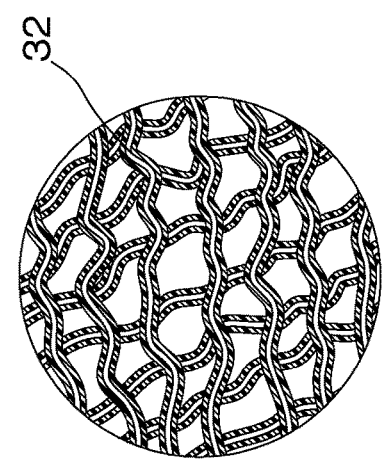

FIG. 5 illustrates a modified process wherein mat 32 is first pre-coated with a thermoplastic layer. This pre-coating process is described in greater detail hereinabove. Other than the pre-coating step, the process depicted in FIG. 5 is the same as that depicted in FIG. 3. Pre-coating station 61 is located immediately downstream from supply roll 60. Thus, as mat 32 is unwound from supply roll 60, it is routed to station 61 via a series of guide rollers. At station 61, a series of roller coaters are used to apply the liquefied hot melt thermoplastic pre-coating. This pre-coating is applied in a continuously flowing and uniform layer to the individual fibers of mat 32. The thermoplastic then immediately cools, thereby eliminating any drying steps. FIG. 6a shows the individual fibers of mat 32 coated with the pre-coating. FIG. 6b is a detailed view showing the coated fibers after the slurry 48 has been applied. As noted, the pre-coating ideally leaves gaps between the individual fibers to allow for the passage of slurry 48. Finally, FIG. 6c is a cross sectional view showing the mats 28, 32), along with core 54 and upper and lower dense slurry layers (46, 48).

An additional station (not shown) can also be included for the pre-treatment step. Namely, a coater can be positioned upstream of station 61 to apply the acid, isopropyl alcohol and silane coupling agent as detailed above. Alternatively, the pre-treatment step can be carried out prior to mat 32 being wound onto supply roll 60.

Hot Melt Applicator

After the forming steps are completed board 20 is then routed to a downstream hot melt applicator for application of polymer coating 56. Polymer coating 56 can applied to board 20 prior to the curing of slurry layers (46, 48, 54) and prior to board 20 passing through associated dryers. Application of polymer coating 56 prior to curing allows for increased mechanical and chemical bonding as coating 56 dries together with underlying slurry layers (46, 48, 52, 54), thereby resulting in a stronger and more durable surface coating.

Alternatively, polymer coating 56 can be applied to board 20 after the slurry layers (46, 48, 52, 54) have been cured and dried. This can also provide a strong bond between coating 56 and the underlying boundary layer 52. The bond is strong enough such that coating 56 is considered to be integral with board 20.

In either event, prior to application of polymer coating 56, board 20 passes through a cleaning station. The cleaning station ensures that dust and debris are removed prior to application of polymer coating 56. Polymer coating 56 can thereafter be applied by any of a wide variety of applicator methods. Ideally, the applicator heats the polymer coating 56 to a temperature of between 100 to 500° F. to thereby keep the polymer in a liquid state during application. Various applicators are disclosed in FIGS. 5-7. Although FIGS. 5-7 disclose single applicators, it is understood that a series of coating applicators, either in series or parallel, or a combination of serials and parallel, can likewise be used.

One suitable applicator is the roller coater depicted in FIG. 5. Roller coater 98 includes both a metering roller 102 and an adjacent application roller 104. Roller 104 is spaced on top of the board assembly line, preferably at a height that matches the thickness of board 20. A supply of heated, liquefied polymer is delivered to the gap between the metering and application rollers (102, 104). Metering roller 102 ensures that a uniform layer of polymer is adhered to application roller 104. Application roller 104 is heated via internal heating elements (not shown). For instance, a heated oil may be passed through piping internal to the roller. This ensures that the temperature of the polymer is maintained and prevents premature curing or solidification. Application roller 104 then applies an even layer of liquid polymer to the dense slurry boundary layer 52 of the underlying board 20. A support roller 106 is utilized beneath application roller 104. The thickness of the polymer layer is determined by the gap between the metering roller 102 and the application roller 104. In the preferred embodiment, upon curing, polymer layer 56 is between 0.01 to 500 mils. The advantage of the roller coater 98 is that application roller 104 is in contact with board 20 for only a short period of time. Thus, the underlying slurry is not exposed to high temperatures for prolonged periods of time. This helps avoid unwanted calcination of the underlying gypsum slurry.

FIG. 6 discloses a curtain type coater 108. This coater includes a heated applicator 112 with an elongated slot or opening 114. The width of slot 114 is made to match the width of the board being produced. However, slightly increasing or decreasing the width of the slot can impart beneficial effects, such as smoothing, texturing, or building up architectural features. A supply of liquid polymer is delivered under the force of gravity through the slot 114 and is directly deposited upon the dense slurry boundary layer 52. In this embodiment, the thickness of the polymer coating 56 is determined, in part, by the size of the applicator opening 114 and the speed of the underlying conveyor.

Figure 7:
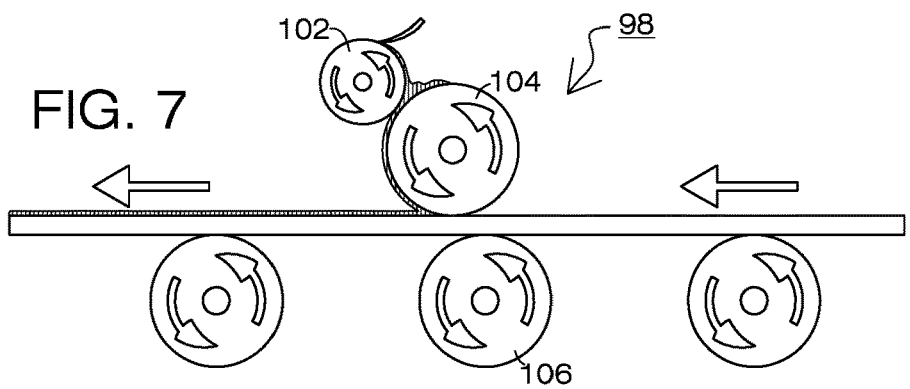
FIG. 7 is a detailed view of a roller coater used to apply the plastic coating of the present invention.
Figure 8:
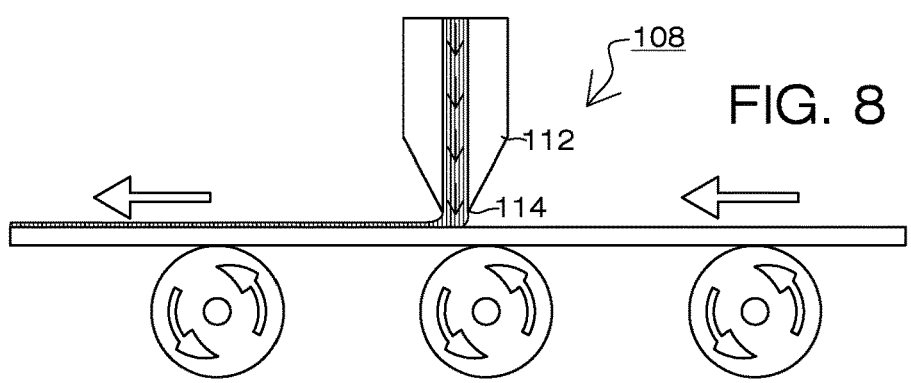
FIG. 8 is a detailed view of a curtain coater used to apply the plastic coating of the present invention.
Figure 9:
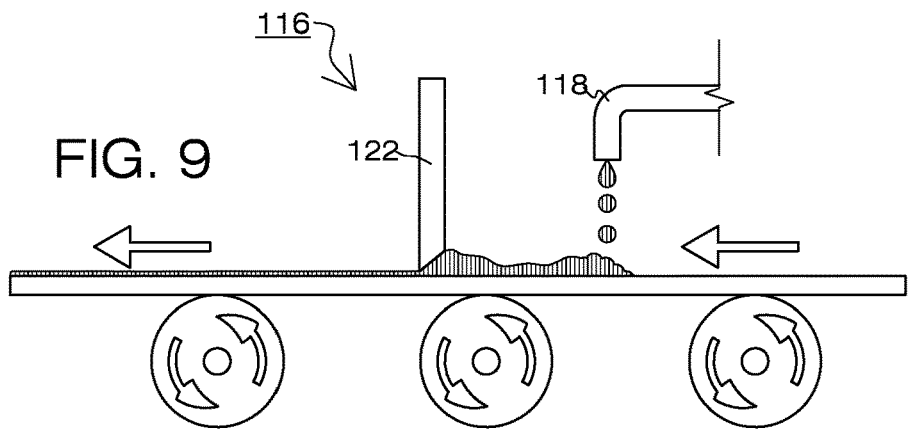
FIG. 9 is a detailed view of a knife coater used to apply the plastic coating of the present invention.
Figure 10:
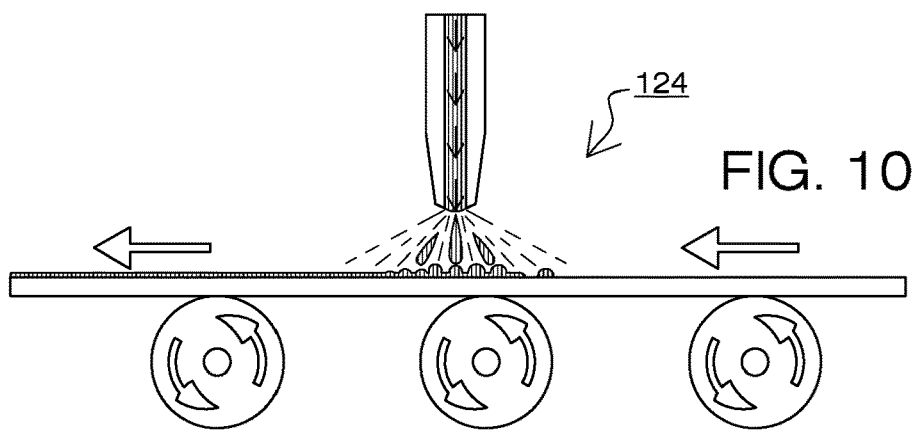
FIG. 10 is a detailed view of a spray coater used to apply the plastic coating of the present invention.

In FIG. 7 a knife or edger coater 116 is depicted. Knife coater 116 includes an outlet supply 118 for the liquefied polymer. This outlet supply 118 delivers a volume of liquid polymer directly onto the dense slurry boundary layer 52. A dam is thereafter created as the liquid polymer encounters scraper 122. Scraper 122, which may be heated, is then used as an applicator to apply a uniformly thin layer of polymer to board 20. In this case, the thickness of the polymer coating 56 is determined by the spacing between scraper 122 and the underlying board. Finally, FIG. 10 illustrates the application of coating 56 via a conventional spray coater 124.

Other applicator types, beyond those described above, can also be utilized. For example, polymer coating 56 can be applied by a hot melt flood coater, a hot melt submersion coater, a hot melt co-extrusion coater, or any combination of the foregoing.

Regardless of the application method, the result is a continuous process for applying a polymer coating 56 to the surface of board 20. Moreover, coating 56 is applied in a continuously flowing and uniform layer to the entire surface of board 20. The thermoplastic then immediately cools, thereby eliminating any drying steps. The physical characteristics of the boards being produced can be easily modified during production by changing the polymer or by the inclusion of polymer additives. This enables a variety of different boards, each having unique physical characteristics for differing applications, to be advantageously produced on a single production line.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A composite structural panel comprising:
   an exterior gypsum layer;
   a mat embedded within the exterior gypsum layer, the mat consisting essentially of fibers that are bound together by a hot melt thermoplastic binder and are not bound together by any thermoset binder, the mat having an exterior surface and an interior surface, wherein the mat is porous and the exterior gypsum layer penetrates through pores of the mat from the interior surface to the exterior surface thereof, and forms an exterior boundary sublayer substantially covering the exterior surface of the mat and an interior boundary sublayer substantially covering the interior surface of the mat;
   an interior gypsum layer formed in contact with the interior boundary sublayer of the exterior gypsum layer, wherein the interior gypsum layer has a lower density than the exterior gypsum slurry layer.

2. The composite structural panel as described in claim 1 wherein the fibers are organic.

3. The composite structural panel as described in claim 1 wherein the fibers are inorganic.

4. The composite structural panel as described in claim 1 wherein the fibers are continuous.

5. The composite structural panel as described in claim 1 wherein the fibers are non continuous.

6. The composite structural panel as described in claim 1 wherein the hot melt thermoplastic is applied in a thickness of between 0.1 to 10 mils.

7. The composite structural panel as described in claim 1 wherein the hot melt thermoplastic is formed from ethylene vinyl acetate (EVA).

8. The composite structural panel as described in claim 1 wherein the hot melt thermoplastic is formed from ethylene methyl acrylonitrile (EAA).

9. A composite structural panel as described in claim 1, wherein the composite structural panel further comprises
   a surface layer of hot melt thermoplastic overlying the exterior boundary sublayer;
   a silane coupling agent that facilitates bonding between the individual fibers, the individual fibers and the hot melt thermoplastic binder, the individual fibers and the exterior gypsum slurry layer slurry layers, and the surface layer of hot melt thermoplastic and the exterior boundary sublayer.

10. The composite structural panel according to claim 1 wherein the interior gypsum layer further includes a polymeric additive, and the exterior gypsum layer further includes an additive that bonds with the polymeric additive of the interior gypsum layer.

11. The composite structural panel according to claim 1, wherein the exterior gypsum layer further includes an additive that bonds with the hot melt thermoplastic binder of the mat.

12. The composite structural panel according to claim 1, wherein the exterior boundary layer of the exterior gypsum layer has a thickness of between approximately 0.01 to 2.0 mm.

13. The composite structural panel according to claim 1, wherein the fibers are preconditioned with silane.

14. The composite structural panel according to claim 1, further comprising a surface layer of hot melt thermoplastic overlying the exterior boundary sublayer of the exterior gypsum layer.

15. The composite structural panel according to claim 14, wherein the hot melt thermoplastic of the surface layer has a melting point temperature in the range of approximately 100° to 500° F.

16. The composite structural panel according to claim 15, wherein the surface layer of hot melt thermoplastic has a thickness the range of 0.01 to 500 mils.

17. A composite structural panel comprising:
   an exterior gypsum layer;
   a mat embedded within the exterior gypsum layer, the mat consisting essentially of fibers that are bound together by a polymeric binder that consists essentially of a hot melt thermoplastic, the mat having an exterior surface and an interior surface, wherein the mat is porous and the exterior gypsum layer penetrates through pores of the mat from the interior surface to the exterior surface thereof, and forms an exterior boundary sublayer substantially covering the exterior surface of the mat and an interior boundary sublayer substantially covering the interior surface of the mat;
   an interior gypsum layer formed in contact with the interior boundary sublayer of the exterior gypsum layer, wherein the interior gypsum layer has a lower density than the exterior gypsum slurry layer.

18. The composite structural panel according to claim 17, wherein the fibers are preconditioned with silane.

19. A composite structural panel comprising:
   an exterior gypsum layer;
   a mat embedded within the exterior gypsum layer, the mat consisting essentially of fibers that are bound together entirely by a hot melt thermoplastic binder, the mat having an exterior surface and an interior surface, wherein the mat is porous and the exterior gypsum layer penetrates through pores of the mat from the interior surface to the exterior surface thereof, and forms an exterior boundary sublayer substantially covering the exterior surface of the mat and an interior boundary sublayer substantially covering the interior surface of the mat;
   an interior gypsum layer formed in contact with the interior boundary sublayer of the exterior gypsum layer, wherein the interior gypsum layer has a lower density than the exterior gypsum slurry layer.

20. The composite structural panel according to claim 19, wherein the fibers are preconditioned with silane.

* * * * *